United States Patent Office 2,714,064
Patented July 26, 1955

2,714,064

DIALKANEPHOSPHINIC ACID AMIDES AND USE THEREOF AS PLANT GROWTH REGULANTS

Rupert C. Morris, Berkeley, John L. Van Winkle, San Lorenzo, and Harry H. Wyrick, Modesto, Calif., assignors to Shell Development Company, Emeryville, Calif., a corporation of Delaware No Drawing. Application July 7, 1952,
Serial No. 297,566

16 Claims. (Cl. 71—2.3)

This invention pertains to new derivatives of phosphorus acids. More particularly, the present invention pertains to novel phosphinic acid amides. Further aspects of the invention pertain to novel compositions of matter useful for horticultural purposes and to methods for the regulation of the growth of plants therewith.

The new phosphorus amides to which the invention pertains are monoamides of dialkane phosphinic acids, having the general formula

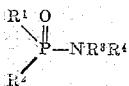

in which $R^1$ and $R^2$ each represent an alkyl group and the group —$NR^3R^4$ represents the residue —$NR^3R^4$ of an organic amine H—$NR^3R^4$. The alkyl groups represented by $R^1$ and $R^2$ may be the same or different and may be, for example, methyl, ethyl, propyl, isopropyl, butyl, amyl, hexyl, octyl, nonyl, tetradecyl, octadecyl, etc. The groups represented by $R^3$ and $R^4$ may be the same or different. The group —$NR^3R^4$ may be the residue of a primary amine $HNHR^4$ or a secondary amine H—$NR^3R^4$. In the preferred compounds of the invention the group —$NR^3R^4$ represents the residue —$NR^3R^4$ of a secondary organic amine H—$NR^3R^4$, wherein $R^3$ and $R^4$ are functionally saturated hydrocarbon groups.

Specific examples of the compounds to which the invention pertains are as follows: N,N-diethyl dimethanephosphinic acid amide, N,N-diisopropyl dihexanephosphinic acid amide, N,N-dibutyl dioctanephosphinic acid amide, N-phenyl-N-methyl dibutanephosphinic acid amide, N,N-dimethyl di-2-ethylhexanephosphinic acid amide, N-methyl-N-isopropyl diethanephosphinic acid amide, N-isopropyl dibutanephosphinic acid amide, N-ethyl-N-butyl butanehexanephosphinic acid amide, and N-naphthyl diethanephosphinic acid amide. It will be understood that the foregoing compounds are mentioned for the purpose of aiding understanding of the invention and that they are not intended to limit the invention. Others are disclosed hereinafter.

The new dialkanephosphinic acid amides of the present invention may be synthesized by the Grignard reaction employing the appropriate N-substituted amidophosphoric dihalide and the appropriate alkylmagnesium bromide. The amidophosphoric dihalide can be prepared in turn from the corresponding phosphorus oxyhalide and primary or secondary amine employing known procedures. In an illustrative synthesis diisopropylamine is reacted with phosphorus oxychloride in known manner to produce N,N-diisopropylamidophosphoric dichloride. The N,N-diisopropylamidophosphoric dichloride then is treated with butylmagnesium bromide in the presence of diethyl ether to produce N,N-diisopropyl dibutanephosphinic acid amide. This method of synthesis may be illustrated by means of the following equations:

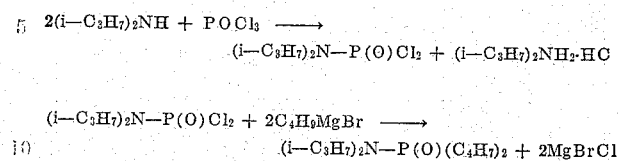

According to another method of synthesis, the dialkanephosphinic acid amides of the invention may be prepared by reaction between a primary or secondary amine and a dialkanephosphinic halide. For example, N-methyl-N-butyl dihexanephosphinic acid amide is obtained by reaction between N-methylbutylamine and dihexanephosphinic chloride according to the equation:

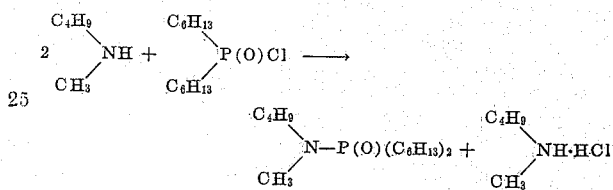

The reaction occurs smoothly in an inert preferably hydrocarbon solvent upon mild heating if required. As shown in the equation an amount of the amine about twice the amount (mole basis) of the dialkanephosphinic halide should be used in order to neutralize the liberated hydrogen halide. Other neutralizing agents may be employed if desired, such as a tertiary amine, and the amount of the dialkyl secondary amine reduced proportionally down to one mole per mole of the dialkanephosphinic halide.

The following examples describe certain of the N,N-dialkyl dialkanephosphinic acid amides to which the invention pertains and show in illustrative detail methods whereby the novel products of the invention can be prepared.

EXAMPLE I

Into a large glass flask there were charged 3060 grams (20 moles) of phosphorus oxychloride. There then were slowly added at 0° C. with cooling 1010 grams (10 moles) of diisopropylamine. The resulting slurry then was heated at boiling (113°–115° C.) under a reflux condenser for 12 hours. The reaction mixture then was cooled, filtered, and the filtrate fractionally distilled. After removal of unreacted phosphorus oxychloride there were recovered 736 grams of N,N-diisopropylamidophosphoric dichloride boiling at 97° C. under 4.5 mm. Hg pressure. To an ethereal solution of the Grignard reagent prepared from 24 grams of magnesium and 1234 grams of butyl bromide there was added an ethereal solution of 604 grams of the N,N-diisopropylamidophosphoric dichloride. When addition was complete, the mixture was warmed to 35°–37° C. for five hours, then cooled, and the magnesium complex was decomposed by treatment with aqueous 20% w ammonium chloride solution. The ethereal layer was separated from the aqueous layer and distilled. There were recovered 404 grams of N,N-diisopropyl dibutanephosphinic acid amide boiling at 124° C. under 0.3 mm. Hg pressure. On standing the N,N-diisopropyl dibutanephosphinic acid amide solidified to a waxy solid melting at 65.1°–71.5° C. Analyses: Found—63.9% C, 12.3% H, 11.8% P; calculated—64.4% C, 12.25% H, 11.89% P.

EXAMPLE II

To a glass flask there was charged a solution of 1380 grams of phosphorus oxychloride in 7.5 liters of diethyl ether. The mixture was cooled and maintained at 5° C. while 1317 grams of diethylamine were added dropwise. The reaction mixture then was refluxed for three hours, cooled, filtered, and the filtrate distilled to recover 573 grams of diethylamidophosphoric acid dichloride as a water-white liquid boiling at 96° C. under 13 mm. Hg pressure. An ethereal solution of 418 grams of the diethylamidophosphoric acid dichloride and the Grignard reagent prepared from 140 grams of magnesium and 535 mls. of butyl bromide was refluxed for 18 hours and the resulting magnesium complex was decomposed by treatment of the mixture with saturated aqueous ammonium chloride solution. N,N-diethyl dibutanephosphinic acid amide was recovered by evaporating the ether from the organic phase separated from the resulting mixture and fractionally distilling. Analyses: Found—61.6% C, 12.2% H, 13.1% P; calculated—61.7% C, 12.0% H, 13.3% P.

EXAMPLE III

To a solution of 55 grams of diethylamine in 50 milliliters of petroleum ether (high boiling cut) a solution of 49.2 grams of dibutanephosphinic acid chloride in the same solvent was added dropwise over a period of ½ hour at 25°–30° C. The resulting mixture then was heated at 80°–90° C. for 1½ hours, cooled, filtered and the filtrate was fractionally distilled. After removal of the solvent and forerun distilling up to 119° C. under 1 mm. Hg pressure N,N-diethyl dibutanephosphinic acid amide was collected as the fraction distilling between 121° C. and 128° C. under 1 mm. Hg pressure. The N,N-diethyl dibutanephosphinic acid had the following properties: refractive index ($n$ 20/D), 1.4597; density (20° C.), 0.9259. Analyses were as follows: Found—61.2% C, 12.9% H, 13.2% P, 5.7% N. Calculated for $C_{12}H_{28}PON$: 61.77% C, 12.09 H, 13.28% P, 6.00% N.

EXAMPLE IV

To a solution of 22 grams of N-methylaniline and 32 grams of pyridine in 300 milliliters of petroleum ether (high boiling cut) a solution of 40 grams of dibutanephosphinic acid chloride in 50 milliliters of the same solvent was added dropwise at 25°–30° C. The resulting mixture was heated at 80°–90° C. for 2 hours, then cooled and filtered, and the filtrate was fractionally distilled. After removal of the solvent and forerun distilling up to 140° C. under 1 mm. Hg pressure N-methyl-N-phenyl dibutanephosphinic acid amide was collected in the amount of 25 grams as the fraction distilling from 150°–175° C. under 1 mm. Hg pressure. The collected N-methyl-N-phenyl dibutanephosphinic acid amide was found to have a refractive index ($n$ 20/D) equal to 1.5147 and a density (20° C.) of 1.0242.

Although the invention has been illustrated in the examples by the N,N-diisopropyl dibutanephosphinic acid amide N,N-diethyl dibutanephosphinic acid amide, and N-methyl-N-phenyl dibutanephosphinic acid amide, it will be understood that the invention includes homologous and analogous N-substituted dialkanephosphinic acid amides. The invention includes, in addition to those hereinbefore specifically named, the following dialkanephosphinic acid amides which can be prepared according to the methods used in the examples: N,N-dimethyl dimethanephosphinic acid amide; N,N-dibutyl didecanephosphinic acid amide; N-methyl-N-1,3-dimethylbutyl dipentanephosphinic acid amide; N,N-di-3,3,5-trimethylhexyl dibutanephosphinic acid amide; di-2-ethylhexyl N,N-di-2-ethylhexyl diisobutanephosphinic acid amide; N-phenyl-N-butyl hexane(octane)phosphinic acid amide; N,N-diphenyl didecanephosphinic acid amide; N-ethyl-N-naphthyl dioctylphosphinic acid amide; N-butyl-N-dodecyl dimethanephosphinic acid amide; N,N-dicyclohexyl dibutanephosphinic acid amide; N,N-didodecyl dibutanephosphinic acid amide; N,N-diallyl dioctanephosphinic acid amide; N-octyl dibutanephosphinic acid amide; N-phenyl dihexanephosphinic acid amide; and N-methyl dimethanephosphinic acid amide.

Although in the novel amides of the invention the alkyl groups represented in the generic formula by $R^1$ and $R^2$ may contain from one to as many as 20 carbon atoms, preference is expressed for the more limited group of amides wherein the alkyl groups represented by $R^1$ and $R^2$ each contain from one to ten carbon atoms, inclusive. The group represented by $—NR^3R^4$ may be the residue $—NR^3R^4$ of an alkylamine, dialkylamine, arylamine, diarylamine, cycloaliphatic primary or secondary amine, or an olefinically unsaturated primary or secondary amine. The amine $HNR^3R^4$ preferably is an unsubstituted, or hydrocarbon, amine and preferably is a secondary amine. The group $—NR^3R^4$ may contain from one to not over about 36 carbon atoms and preferably contains from about one to about twenty carbon atoms. In the preferred compounds of the invention $R^3$ and $R^4$ are functionally saturated hydrocarbon groups each containing from one to ten carbon atoms. The term "functionally saturated hydrocarbon group" is used to refer to hydrocarbon groups which, in common with the alkyl groups, are resistant to hydrogenation, namely the alkyl groups, aryl groups, and saturated cycloaliphatic groups.

The novel dialkanephosphinic acid amides of this invention are useful for regulating the growth characteristics of plants. They can be employed for the preparation of novel compositions which are useful for horticultural purposes and particularly as herbicides and as agents for inducing defoliation of deciduous plants. As defoliants the dialkanephosphinic acid amides of the invention appear to be unique among the compounds heretofore known to be active as defoliants in that the dialkanephosphinic acid amides are capable of inducing young growing plants or plants bearing young leaf growth, for example, second growth, to abscise the young, growing leaves. Application of the phosphorus amides of the invention also will induce abscission of mature leaves. The mode of action on or within the plant of the amides of the invention is not at all well understood; visual observation of plants and plant tissues treated therewith give evidence that an anti-enzymatic action in and upon enzyme systems of the plant tissues is involved. The herbicidal action of the amides of the invention appears to be dependent upon exposure of the plant to light at least after application of the active agent. The action of the novel amides of the invention is to be clearly distinguished from the action upon plants of the known commercially employed defoliants, which induce defoliation essentially by cauterization and consequent senescence of leaves comparable to the action of frost, nutrient starvation, drought, or the like.

The action of the dialkanephosphinic acid amides of the invention in inducing defoliation of early or immature leaf growth is of technical importance as in defoliation of cotton plants being immature top growth, of cotton bearing young second-growth leaves, and of selected nursery stocks.

The novel compositions of this invention, suitable for horticultural use, comprise one or more of the dialkanephosphinic acid amides of the invention dissolved or suspended in or carried by an appropriate horticultural carrier, including without being limited to one or more of water, mineral spray oils, or other solvents, inert finely pulverulent solids, such as talc, bentonite, gypsum, lime, or the like. The concentration of the dialkanephosphinic acid amide in the horticultural compositions of the invention may vary from as little as 0.01% by weight to as much as 15% by weight of the total composition according to the particular formulation and intended application. The compositions containing the dialkanephosphinic acid amide in but low concentrations, usually between about 0.005% and about 0.75% by weight, have been found to be lethally toxic towards herbaceous plants while at the same time exerting little or no adverse effects upon woody tissued plants such as trees, shrubs, and the like. These compositions, as a consequence, are useful in weeding plantings of woody tissued plants, such as berry plants, ornamental shrubs, trees, etc. The compositions containing higher concentrations of the dialkenephosphinic acid amides of the invention, preferably from about 0.75 upwards to about 5% by weight, when applied to the leaves of deciduous plants induce defoliation by the plant. The most important commercial application of these compositions at the present time appears to be the defoliation of cotton. They may also be used, however, for defoliation of other deciduous plants, among which are included soybean plants, lima and string beans, apple and peach trees, and selected nursery stocks such as hydrangea, holly, and the like. At still higher concentrations, ranging upwards to 15% by weight and more, dialkanephosphinic amides of the invention can be used effectively to sterilize soil, killing all plant growth therein.

Although unrefined and/or highly aromatic mineral oils can be used as the horticultural carrier, for spray application the horticultural carrier preferably will be a light mineral oil of intermediate viscosity and volatility. Suitable mineral oils are bland, non-toxic oils such as mineral seal oil, kerosene, refined gas oil, very light lubricating oils, and the like. Although the oil usually will be of mineral origin, oils of animal or of vegetable origin may also be employed as the carrier. In general, the oil used as the carrier should be one which boils between about 300° F. and about 800° F., and preferably should have a viscosity not over about 60 S. S. U. at 100° F. Blends of oils may be used. For the defoliation of cotton the carrier should, of course, be one which does not lead to undesirable staining of the cotton in the open bolls. Highly paraffinic refined oils, having an unsulfonatable residue preferably greater than about 85%, desirably are employed as the carrier in the compositions to be used for the defoliation of cotton. The compositions of the invention may contain in addition to the active dialkanephosphinic acid amide adjuncts such as wetting or spreading agents, auxiliary active agents, and the like, although the preferred compositions contain the dialkanephosphinic acid amide as the sole physiologically active agent in order to avoid any possible interference with the physiological action of the dialkanephosphinic acid amide. The dialkanephosphinic acid amide or a solution thereof in a mineral oil or other water-immiscible solvent, may be suspended in water and the suspension or emulsion applied. Such emulsions or suspensions, as well as simple solutions of the active agents of the inventions, are included within the invention as it pertains to the novel compositions of matter useful for horticultural purposes.

The rate of application of the composition containing the dialkanephosphinic acid amide will be governed inter alia by the method of application, the identity of the particular dialkanephosphinic acid amide contained in the composition, the variety of plant to which the composition is to be applied, the age and condition of growth of the plant, and the like. For application as, for example, a cotton defoliant, the composition may be applied at a rate corresponding to from about 0.1 to about 4 pounds of the dialkanephosphinic acid amide per acre. Thus, a 2% solution of a dialkanephosphinic acid amide in a light paraffinic mineral oil when applied at the rate of 8.5 gallons per acre gives approximately 1.5 pounds of the dialkanephosphinic acid amide per acre. The novel compositions comprising the dialkanephosphinic acid amides when employed as herbicides may be applied directly to the soil as between the rows of established crops, such as lettuce, carrots, beets, cabbage, broccoli, and similar truck garden crops. They may be used as pre-emergence herbicides to rid an area of already growing weeds prior to the emergence of the young plants from seeds planted in the area. At high rates of application the dialkanephosphinic acid amides of the invention can be used to effectively clear a selected area of plant growth by application to the growing plants or, preferably, onto and into the soil supporting the growth of the plants.

The application of the compositions containing the dialkanephosphinic acid amides of the invention may be any of the techniques customarily employed in the field, including without being limited to spray application from ground equipment, as tractor-drawn spray rigs, dusting, and application from low flying airplanes.

The following examples illustrate the aspects of the invention which pertains to the novel horticultural compositions and horticultural methods.

EXAMPLE V

The herbicidal action of N,N-diisopropyl dibutanephosphinic amide, a typical compound of the invention, was tested against oats (*Avena sativa*) and radishes (*Raphanus sativus*). The tests were carried out by spraying downwardly onto nursery pots in which seeds of the test plants had been planted, constant measured amounts of aqueous solutions of the N,N-diisopropyl dibutanephosphinic amide at differing concentrations. The tests thus were carried out under constant conditions except for the amount of the N,N-diisopropyl dibutanephosphinic amide applied. Two series of tests were run in duplicate. In the first the surface of the soil in the pots was sprayed immediately after planting of the seeds. The effect upon germination and emergence of the plant thus was ascertained. In the second series the pots containing the emerged plants were sprayed seven days after planting. In this series the effect upon the established young plant was ascertained. The results shown in the following table were observed.

*Table I*

| Concentration of N,N-diisopropyl dibutanephosphinic amide, percent by weight | Test Plant | | | |
|---|---|---|---|---|
| | Oats | | Radishes | |
| | Spray Applied at Time of Planting | Spray Applied 7 Days After Planting | Spray Applied at Time of Planting | Spray Applied 7 Days After Planting |
| 0.01 | N, N | N, N | N, N | D, N |
| 0.025 | S, sS | N, sS | X, D | D, D |
| 0.05 | S, X | S, D | X, X | D, D |
| 0.1 | S, S | D, D | X, X | D, D |
| 0.25 | D, D | D, D | X, D | D, D |
| 0.5 | D, X | D, D | X, X | D, D |

Legend:
N—normal growth
X—no germination
sS—plant slightly stunted
S—plant seriously stunted
D—Emerged plant died

EXAMPLE VI

The herbicidal action of N,N-diisopropyl dibutanephosphinic amide was further tested against 10 day-old pinto bean plants. The plants were sprayed with fixed quantities of solutions of the active agent, about 2.5 cc. of solution being applied per 3–4" nursery pot containing the growing plants. The plants were observed 24 hours after spraying and again 13 days after spraying, and the condition of the plant graded on a scale of 0, representing no injury, to 4, representing death. For comparison, parallel tests were made using pentachlorophenol, an outstanding known herbicide, and also differing solvents. The results shown in the following table were observed:

Table II

| Test No. | Active Agent | Solvent | Concentration of Active Agent Percent by weight | Condition of Test Plants | |
|---|---|---|---|---|---|
| | | | | 24 Hours After Spraying | 13 Days After Spraying |
| 1 | N,N-diisopropyl dibutane phosphinic amide. | Refined Kerosene | 0.0625 | | 4; 3.8 |
| 2 | do | do | 0.125 | | 4; 4 |
| 3 | do | do | 0.25 | | 4; 4 |
| 4 | do | do | 0.5 | | 4; 4 |
| 5 | do | do | 1.0 | | 4 |
| 6 | do | do | 0.25 | 1½ | 4 |
| 7 | None | do | | 0 | 0 |
| 8 | Pentachlorophenol | do | 0.0625 | | 0.2; 0.2 |
| 9 | do | do | 0.125 | | 0.5; 0.5 |
| 10 | do | do | 0.25 | | 1; 3½ |
| 11 | do | do | 0.5 | | 4; 4 |
| 12 | do | do | 1.0 | | 4 |
| 13 | do | do | 0.25 | 4 | 4 |
| 14 | N,N-diisopropyl dibutanephosphinic amide. | diesel oil | 0.1 | | 4 |
| 15 | None | do | | | 1 |

Comparison of tests 1 to 5 with tests 8 to 12 shows that the N,N-diisopropyl dibutanephosphinic amide was lethal at concentrations only a fraction of the concentration of pentachlorophenol required for kill. Comparison of tests 6 and 13 shows that the N,N-diisopropyl dibutanephosphinic amide is slower acting than the pentachlorophenol. This indicates a hormonal action of the amide as contrasted to the caustic action of the pentachlorophenol. Tests 14 and 15 show solutions of the N,N-diisopropyl dibutanephosphinic amide in a widely available petroleum solvent to be effective. Problems arising from any need for special solvents and shipments of the solutions or of the special solvents therefore, thus are avoided.

EXAMPLE VII

Solutions of N,N-diisopropyl dibutanephosphinic amide at 1% concentration in diesel oil were sprayed on field-grown early cotton. Excellent defoliation, including abscission of the young leaves, was obtained.

While the invention has been illustrated by certain specific examples, it will be appreciated that the invention is not restricted to the specific embodiments shown in the examples and that many other specific embodiments come within the purview of the broader aspects of the invention.

We claim as our invention:

1. N,N-diisopropyl di-n-butanephosphinic acid amide.
2. N,N-diethyl di-n-butanephosphinic acid amide.
3. An N,N-dialkyl dialkanephosphinic acid amide.
4. As a new chemical compound, a chemical compound having the structure represented by the formula

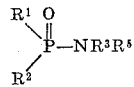

in which $R^1$ and $R^2$ each represent an alkyl group and the group $-NR^3R^4$ represents the residue $-NR^3R^4$ of an amine $H-NR^3R^4$ selected from the class consisting of the alkylamines, dialkylamines, arylamines, diarylamines, cycloaliphatic amines and olefinically unsaturated amines.

5. A composition of matter suitable for horticultural use comprising a solution of N,N-diisopropyl di-n-butanephosphinic acid amide at a concentration between about 0.01% and about 4% by weight in a highly paraffinic refined mineral oil having an unsulfonatable residue of at least about 85%.

6. A composition of matter suitable for horticultural use comprising a solution of an N,N-dialkyl dialkanephosphinic acid amide at a concentration between about 0.01% and about 4% by weight in a highly paraffinic refined mineral oil having an unsulfonatable residue of at least about 85%.

7. A composition of matter suitable for horticultural use comprising a solution of an N,N-dialkyl dialkanephosphinic acid amide in intimate admixture with an horticultural carrier for said N,N-dialkyl dialkanephosphinic acid amide.

8. A composition of matter suitable for horticultural use comprising a phosphorus-containing compound of the formula

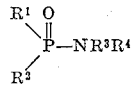

in which $R^1$ and $R^2$ each represent an alkyl group and the group $-NR^3R^4$ represents the residue $-NR^3R^4$ of an amine $H-NR^3R^4$ selected from the class consisting of the alkylamines, dialkylamines, arylamines, diarylamines, cycloaliphatic amines and olefinically unsaturated amines, and a horticultural carrier therefor.

9. The method of defoliating foliate cotton plants which comprises applying to the leaves thereof an amount sufficient to effect defoliation of N,N-diisopropyl di-n-butyl di-n-butanephosphinic acid amide in the form of a solution in a highly paraffinic refined mineral oil having an unsulfonatable residue of at least about 85%.

10. The method of defoliating foliate cotton plants which comprises applying to the leaves thereof an N,N-dialkyl dialkanephosphinic acid amide in intimate admixture with a horticultural carrier for said N,N-dialkyl dialkanephosphinic acid amide at a rate of from about 0.1 to about 4 pounds per acre.

11. The method of killing undesired herbaceous plants which comprises applying to the soil which normally supports the growth thereof a sufficient amount of an N,N-dialkyl dialkanephosphinic acid amide.

12. The method of killing undesired herbaceous plants which comprises applying to the leaves thereof a toxic amount of an n,n-dialkyl dialkanephosphinic acid amide in intimate admixture with a horticultural carrier therefor.

13. The method of regulating the growth of a plant which comprises subjecting said plant to the action of an N,N-dialkyl dialkanephosphinic acid amide, said amide being applied in an amount sufficient to regulate the growth of said plant.

14. The method of regulating the growth of a plant which comprises subjecting said plant to the action of a phosphorus-containing compound of the formula

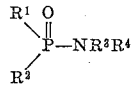

in which $R^1$ and $R^2$ each represent an alkyl group and the group $-NR^3R^4$ represents the residue $-NR^3R^4$ of an amine $H-NR^3R^4$ selected from the class consisting of the alkylamines, dialkylamines, arylamines, diarylamines, cycloaliphatic amines and olefinically unsaturated amines, said compound being applied in an amount sufficient to regulate the growth of said plant.

15. The method of killing undesired herbaceous plants which comprises applying to the leaves thereof a toxic amount of a phosphorus-containing compound of the formula

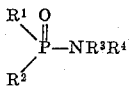

in which $R^1$ and $R^2$ each represent an alkyl group and the group $-NR^3R^4$ represents the residue $-NR^3R^4$ of an amine $H-NR^3R^4$ selected from the class consisting of the alkylamines, dialkylamines, arylamines, diarylamines, cycloaliphatic amines and olefinically unsaturated amines.

16. The method of defoliating foliate cotton plants which comprises applying to the leaves thereof a phosphorus-containing compound of the formula

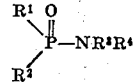

in which $R^1$ and $R^2$ each represent an alkyl group and the group $-NR^3R^4$ represents the residue $-NR^3R^4$ of an amine $H-NR^3R^4$ selected from the class consisting of the alkylamines, dialkylamines, arylamines, diarylamines, cycloaliphatic amines and olefinically unsaturated amines, said phosphorus-containing compound being applied in an amount sufficient to effect defoliation.

References Cited in the file of this patent

Gibson et al., "J. Chem. Soc." (London) 1928, pp. 92 to 99.

Kosolapoff, "Organo-Phosphorus Compounds" (1950) pp. 279 to 281, 289 and 317.